May 22, 1923.

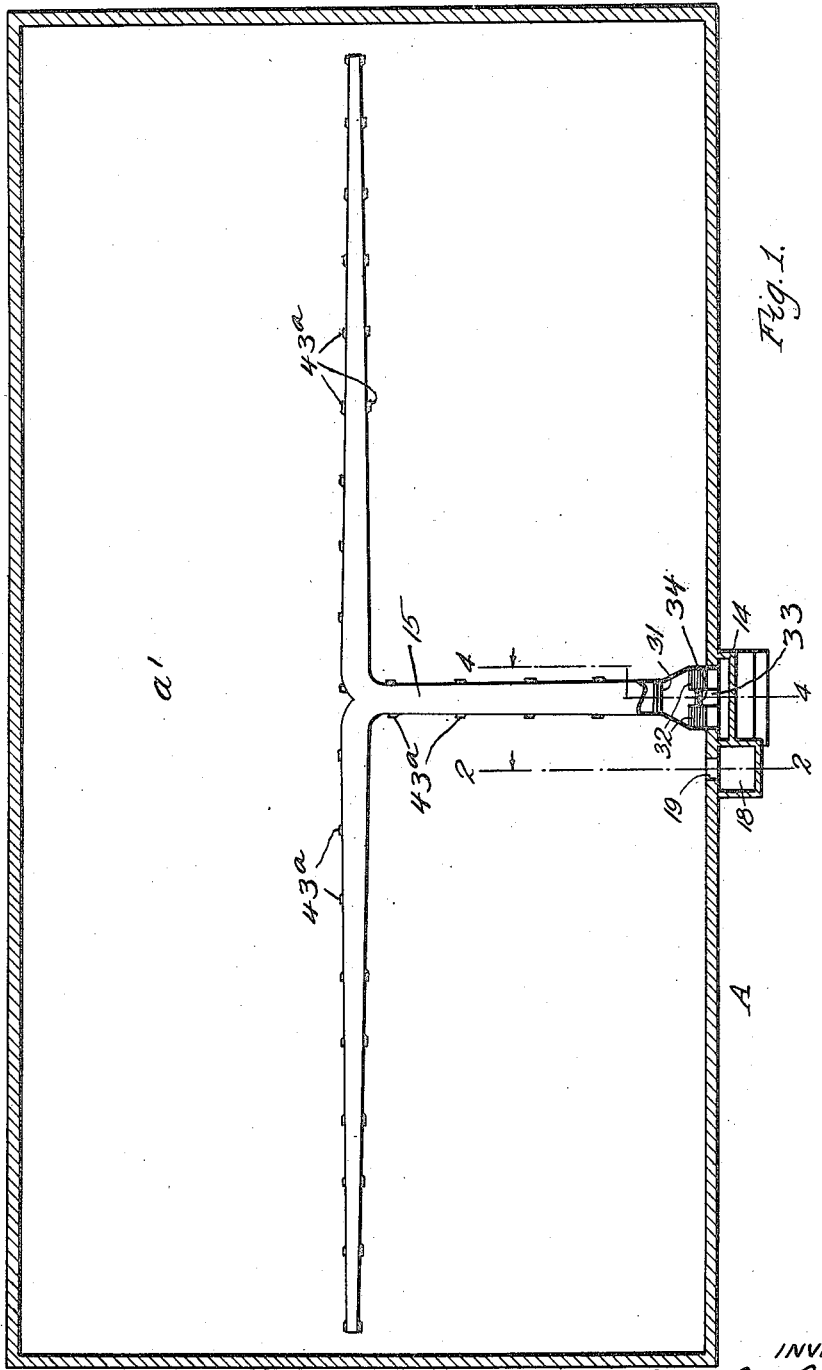

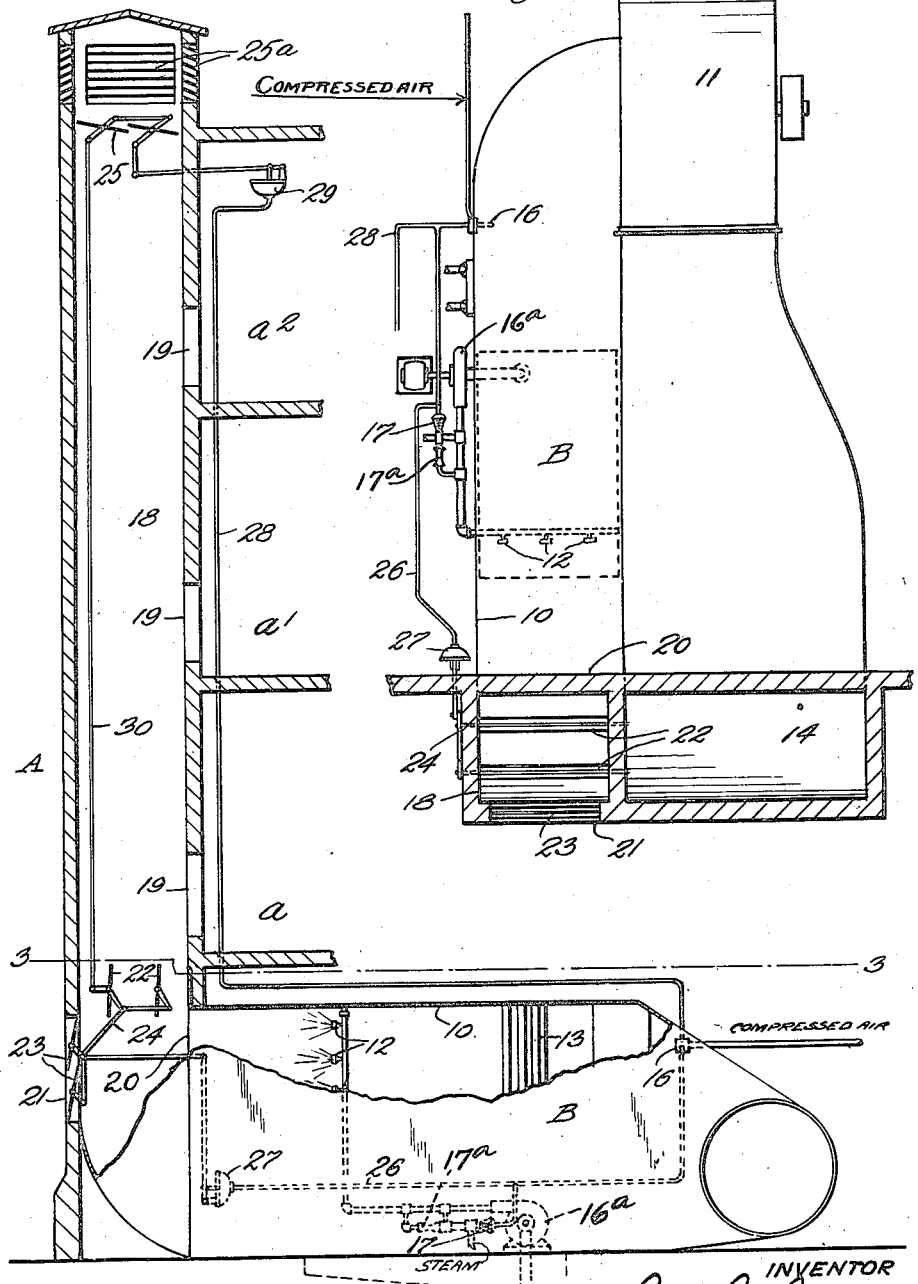

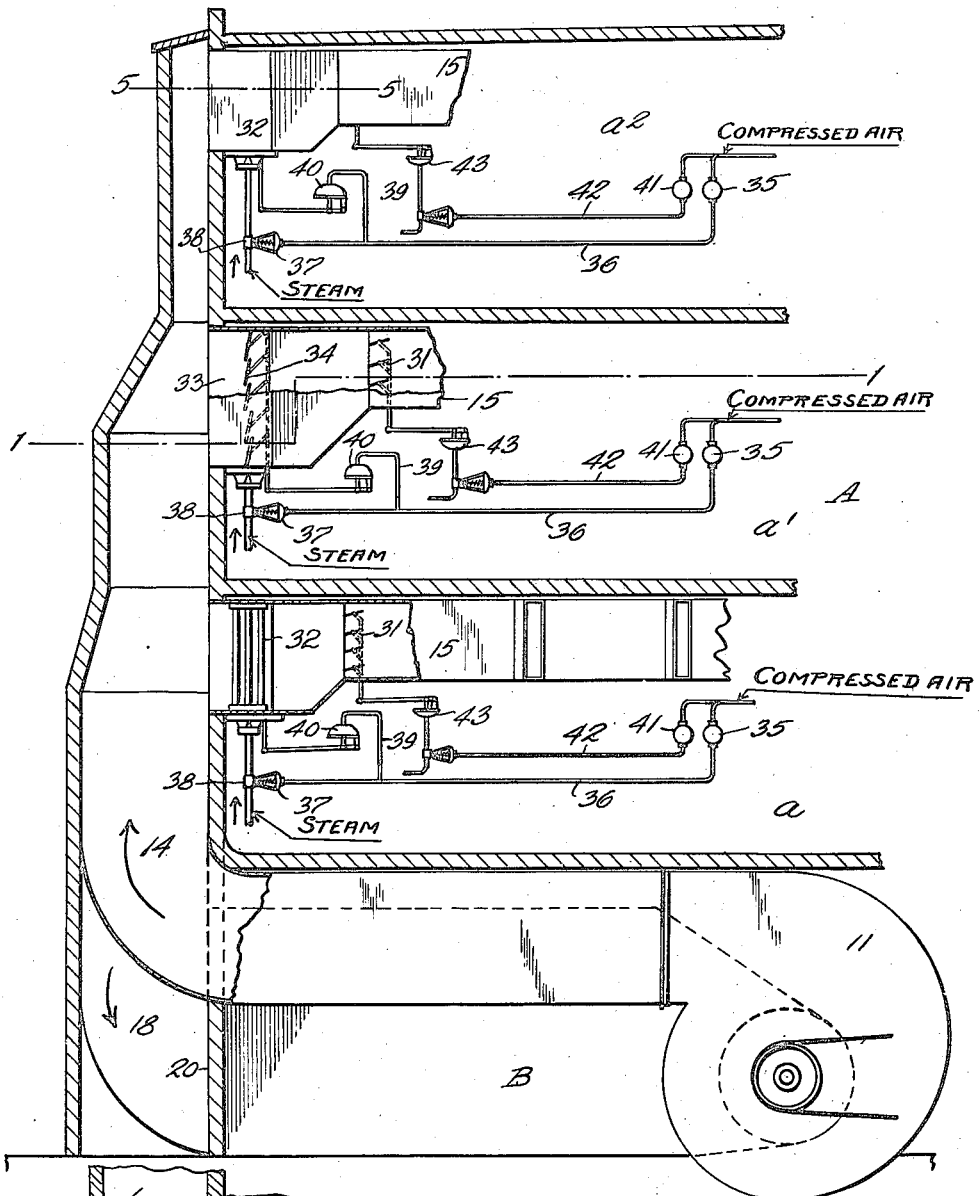
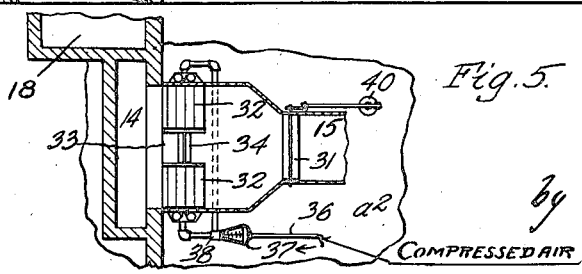

L. L. LEWIS

AIR CONDITIONING OR HUMIDIFYING AND HEATING SYSTEM

Filed Feb. 20, 1920     4 Sheets-Sheet 4

1,455,846

INVENTOR
Leo L. Lewis.
BY Parker & Buchanan
ATTORNEYS

Patented May 22, 1923.

1,455,846

UNITED STATES PATENT OFFICE.

LEO L. LEWIS, OF PLAINFIELD, NEW JERSEY, ASSIGNOR TO CARRIER ENGINEERING CORPORATION, OF NEW YORK, N. Y.

AIR-CONDITIONING OR HUMIDIFYING AND HEATING SYSTEM.

Application filed February 20, 1920. Serial No. 360,263.

*To all whom it may concern:*

Be it known that I, LEO L. LEWIS, a citizen of the United States, residing at Plainfield, in the county of Union and State of New Jersey, have invented a new and useful Improvement in Air-Conditioning or Humidifying and Heating Systems, of which the following is a specification.

This invention relates to humidifying and heating and other air conditioning systems, in which a central type air humidifying or conditioning apparatus is used for supplying one or more rooms with air having definite, desired conditions of humidity and temperature. While the invention is especially desirable in cases where it is necessary to maintain definite, like or different conditions of humidity and temperature in a plurality of rooms or in the several rooms or stories of a building, the invention is not restricted to such applications. It is also applicable to other uses, such as cooling and drying.

In some buildings the air leakage permitted by door and window cracks or other openings, due to poor construction or otherwise, is sufficient to allow an active circulation or change of air in the rooms, but this uncontrolled escape of the conditioned air or infiltration of outside air prevents an accurate control of the conditions and is wasteful and expensive. On the other hand, if the building is made tight enough to prevent objectionable leakage and ensure the maintenance of a desired condition, it is necessary to make provision for the relief of the internal air pressure as required to give the proper air change. Whenever heating is necessary to secure the required conditions, it is desirable to recirculate the air and recondition return air from the rooms as far as possible in order to save fuel, whereas it is often necessary to supply outside air to the air conditioner to obtain a cooling effect, and when outside air is admitted there should be a corresponding relief of the return air in order to prevent an increase of the pressure in the rooms which will prevent the proper supply of conditioned air to them.

In controlling the humidity and temperature conditions in a single room, the speed of the air conditioning apparatus can be conveniently changed to meet large variations in conditions, but it is very difficult from a practical standpoint, to maintain definite, required conditions in several different rooms, and it is necessary for the air conditioning apparatus to be operated approximately at or above the speed necessary to maintain the maximum, required air condition throughout the building or all of the rooms.

One object of this invention is to provide a practical system of the central air humidifier or conditioner type, which is efficient and economical in operation, and enables the predetermined temperature and humidity conditions required in the room or in the different rooms or stories of a building to be accurately maintained, whether these conditions be alike or different.

Another object of the invention is to improve air humidifying and heating or conditioning systems of the kind mentioned in the respects hereinafter described and set forth in the claims.

In the accompanying drawings:

Fig. 1 is a plan view, partly in section on line 1—1, Fig. 4, of one of the stories of a building equipped with a humidifying and heating system embodying the invention but omitting the control mechanism.

Fig. 2 is a fragmentary sectional elevation thereof, enlarged, on line 2—2, Fig. 1.

Fig. 3 is a sectional plan view thereof, on line 3—3, Fig. 2.

Fig. 4 is a fragmentary sectional elevation thereof, enlarged, on line 4—4, Fig. 1.

Fig. 5 is a fragmentary sectional plan view thereof, on line 5—5, Fig. 4.

Figure 6:
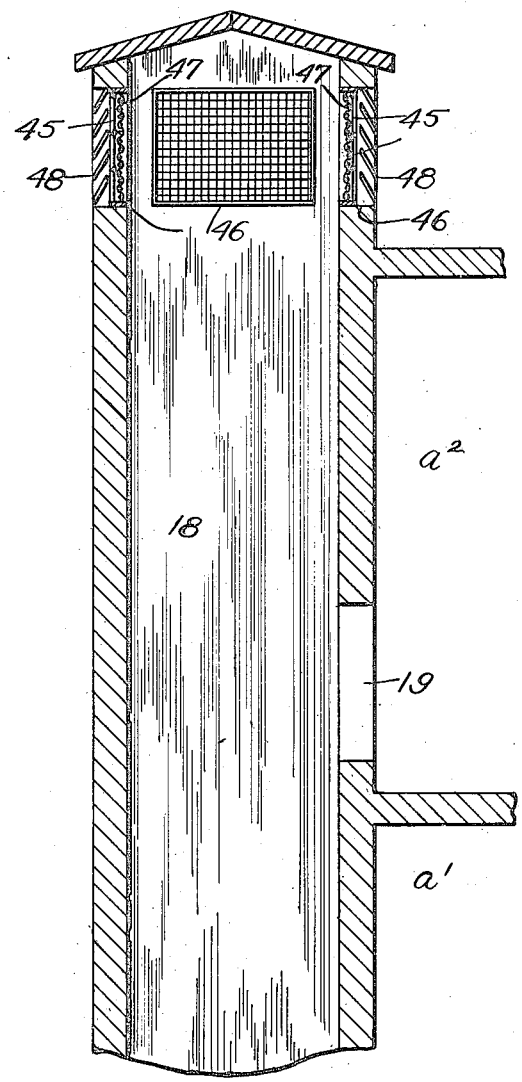
Fig. 6 is a sectional elevation showing another kind of air relief means.

The drawings do not attempt to show in detail the construction of the building and all of the parts or adjuncts of a complete air conditioning system, the construction and arrangement of which vary for different installations, depending upon the type of building and other conditions, but show only, and to some extent diagrammatically, the parts necessary to a clear understanding of the invention.

A represents a building having a plurality of stories or rooms $a$ $a'$ $a^2$, in which it is desired to maintain definite humidity and temperature conditions. B represents a central air conditioning or humidifying apparatus adapted to supply conditioned air for delivery to the several rooms or stories of the building. This apparatus may be of any known or suitable construction, preferably adapted to supply air having a definite or predetermined dew point or absolute humidity, and it can be located in any suitable place and connected by any appropriate system or arrangement of flues for supplying the humidified air to the several rooms and for conveying return air from the rooms back to the air conditioner. As shown, the apparatus B is located in the basement or ground floor of the building below the rooms which are to be supplied with the conditioned air, and is of well known type, comprising a casing 10, through which the air is drawn by a fan 11, and in which the air is conditioned by contact with a fine spray of water discharged under the required pressure from suitable spray nozzles 12 in the casing 10, and an eliminator 13, through which the air flows after passing through the water spray for removing the free particles of entrained moisture from the air. The fan delivers the air to a main air trunk or flue 14 which leads to the several stores or rooms of the building, and is provided with a branch air duct 15, entering each of the rooms. The apparatus is provided with means for fixing or determining the dew point or absolute humidity of the air delivered by the fan so that air having the same absolute humidity is delivered to the several rooms of the building. This may be accomplished by means, such for instance as the dew point control, disclosed in the patent granted May 21, 1907, to Willis H. Carrier, assignor, No. 854,270, whereby the absolute humidity of the air delivered by the humidifier is controlled by saturating the air with moisture and regulating the temperature in the humidifier under the control of the saturation temperature of the air leaving the humidifier. Briefly stated, this control comprises a thermostat 16 which is influenced by the saturation temperature of the humidified air leaving the humidifier and controls the operation of a valve 17, by which the temperature of the spray water (which is recirculated by a pump 16$^a$, being drawn from the collecting well in the bottom of the air conditioner B and delivered to the spray nozzles 12) is regulated so as to cause the air to be saturated at the particular temperature for which the thermostat is set. The valve 17 can regulate the temperature of the spray water either as disclosed in said patent, or by controlling the supply of steam, for instance to an ordinary injector water heater shown at 17$^a$ for heating the water. Reference may be had to said patent for a more complete explanation of the construction and operation of the control means. Any other known or suitable means adapted to control the dew point or absolute humidity of the air leaving the humidifier could be used.

18 represents a return air flue which connects by openings 19 with the several rooms $a$—$a^2$, and as shown, extends vertically at one side of the building, preferably adjacent to the main air supply trunk, and connects at its lower end with the inlet end 20 of the humidifier casing. 21 indicates a suitable opening or passage for admitting fresh or outside air to the humidifier, and 22 and 23 represent dampers controlling respectively the admission to the humidifier of return air from the flue 18, and fresh air from the opening 21. These return and fresh air dampers may be of any suitable or usual construction and arrangement. As shown, each damper comprises a plurality of centrally pivoted plates which are connected to swing in unison, and the fresh air and return air dampers are connected by a link and lever mechanism 24 or other means, whereby one damper will open as the other closes, and conversely, in such a manner as to enable either all return air, all fresh air, or differently proportioned mixtures of fresh and return air to be supplied to the humidifier, depending upon the adjustment of the dampers.

25 represents a relief damper which is preferably arranged in the upper end of the return air flue 18, above the opening 19 thereinto from the top room or story of the building. The upper end of the flue 18 is open to the atmosphere for the escape of air, preferably through suitable stationary louvres 25$^a$. The relief air damper 25 may, like the fresh and return air damper, consist of a plurality of centrally pivoted plates which are connected to swing in unison, or it may be of any other suitable construction. This damper is actuated by suitable mechanism adapted to cause the relief damper to open when and in proportion as the fresh air damper opens, and conversely, to close as the fresh air damper closes, so that whenever fresh air is taken in through the fresh air damper, an equal amount of air is relieved from the return flue through the relief damper. The return air, fresh air and relief dampers are preferably operated in the stated relation to each other, under the control of the dew point thermostat 16 in the humidifying apparatus, through the medium of any suitable operating mechanism. For this purpose, in the construction shown, the thermostat controls the flow of compressed air from a suitable source of supply through a pipe 26 to an actuating diaphragm or motor 27 for the return air and fresh air dampers, and through a pipe 28 to an actuating diaphragm or motor 29 for the relief damper. The relief and return air dampers are also shown as connected by a rod 30 and levers to insure opposite and equal movements of these dampers. The thermostat 16 regulates the saturation temperature in the humidifier, as before explained, and the described cooperating control of the fresh and return air admitted to the humidifier enables a great saving in the steam or other source of heat necessary to maintain the required absolute humidity or dew point of the air delivered by the humidifier to the several rooms of the building. Nevertheless, by permitting or preventing the relief of the return air in conjunction with the regulation of the supply of fresh and return air to the humidifier in the manner explained, the pressure of air handled and the operation of the humidifying or conditioning apparatus are substantially uniform, and it is not necessary to change the speed of the apparatus to meet the varying conditions which arise.

The volume and temperature of the air admitted to each of the stories or rooms of the building is separately controlled so as to separately regulate, as required, the temperature and humidity conditions in each of the rooms. For this purpose the branch air supply duct 15 leading to each of the rooms or stories is provided with a damper 31 of any suitable construction, adapted to be adjusted for increasing or decreasing the volume of air delivered to the room, and a heater or heaters 32 for the air supplied to the room is or are preferably arranged in the branch air duct 15 between the volume dampers and the main air supply flue 14 so that the air is heated before it is discharged into the room. Preferably, two steam heaters or heating coils are arranged in each of the branch air ducts and are separated by a by-pass passage 33 through which the air can pass the heaters without being heated when it is not necessary to raise the temperature of the air. This air by-pass passage is controlled by a damper 34 of any suitable sort adapted to be adjusted so as to cause the air entering the room either to pass through or be by-passed around the heaters, as may be necessary to give the desired temperature in the room. Each heater is controlled by a thermostat 35 located in the room which that heater supplies, and which can regulate the supply of steam to the heater by any suitable means, as for instance by controlling the flow of compressed air through a pipe 36 to the actuating diaphragm or motor 37 for the steam supply valve 38 of the heater. This thermostat also controls the by-pass damper 34, so that this damper is opened whenever the steam for the heater is turned off, and conversely, is closed when the steam is turned on. The reason for this is that less air is needed for heating than for cooling, and the excess volume of air is by-passed in order to reduce the heater to a practicable size. For this purpose the thermostat 35 controls the flow of compressed air through a pipe 39 to an actuating diaphragm or motor 40 for the by-pass damper.

The volume damper 31 controlling the supply of air admitted to the room is preferably regulated by a hygrostat 41 located in the room and controlling the flow of compressed air through a pipe 42 to an actuating motor or diaphragm 43 for the volume damper. Any other suitable instrumentalities for this purpose could be used. Preferably the air supply duct 15 for each room or story is branched so as to extend centrally lengthwise through the room and is provided with outlet nozzles 43$^a$ for delivering the air at suitable points along the duct so as to properly distribute the air.

The relief of the air from the rooms as required depending upon the supply of fresh or return air thereto, can be accomplished in other ways, as for instance by dampers actuated by the air pressure in the rooms or return flue, as shown in Fig. 6. In this figure, 45 represents flap valves or dampers hung loosely in a relief opening 46 in the return flue 18. A coarse wire screen 47 at the inner side of the valves prevents them from opening inwardly and admitting outside air, but a predetermined air pressure in the rooms or flue 18 will cause the valves to open outwardly and permit the escape of air so as to relieve the pressure. 48 indicates the usual stationary louvres outside of the flap valves. Whenever, therefore, the return and fresh air dampers 22 and 23 are operated so as to cause an increase in pressure in the rooms or flue, the relief valves 45 will open and appropriately relieve the pressure.

I claim as my invention:

1. In an air conditioning system, the combination of an air conditioner, air supply and return flues connecting the conditioner with a room or rooms, fresh and return air dampers controlling respectively the admission of return air from the room or rooms and fresh air to the conditioner, a relief damper for permitting escape of the return air, regulating means for actuating said fresh and return air dampers for controlling the humidity of the air supplied to the room or rooms by the conditioner, said means causing one of said dampers to open as the other closes, and means also controlled by said regulating means for opening or closing said relief damper correspondingly as said fresh air damper is respectively opened or closed.

2. In an air conditioning system, the combination of an air conditioner, air supply and return flues connecting the conditioner with a room or rooms, means for admitting fresh air to the conditioner, humidity regulating means for causing a predetermined definite humidity of the air supplied by the conditioner for delivery to the room or rooms, means controlled by said regulating means for regulating the admission of fresh air and return air to the conditioner and constructed to increase or decrease the admission of fresh air in proportion as the admission of return air is decreased or increased, and relief means constructed to permit or prevent escape of the return air accordingly as the admission of return air to the conditioner is decreased or increased.

3. In an air conditioning system, the combination of an air conditioner, air supply and return flues connecting the conditioner with a room or rooms, means for admitting fresh air to the conditioner, humidity regulating means for controlling the humidity of the air supplied to the room or rooms by the conditioner, means controlled by said humidity regulating means for regulating the admission of fresh and return air to the conditioner and constructed to increase or decrease the admission of fresh air in proportion as the admission of return air is decreased or increased, and means also controlled by said humidity regulating means for permitting or preventing escape of the return air in proportion as the admission of fresh air is increased or decreased.

4. In an air conditioning system, the combination of an air conditioner, air supply and return flues connecting the conditioner with a room or rooms, means for admitting fresh air to the conditioner, regulating means for controlling the temperature in the conditioner to maintain a predetermined humidity of the air supplied to the room or rooms by the conditioner, means controlled by said regulating means for regulating the admission of fresh and return air to the conditioner and constructed to increase the admission of fresh air and decrease the admission of return air and conversely for decreasing or increasing the temperature in the conditioner, and relief means constructed to permit or prevent the escape of return air accordingly as the admission of fresh air to the conditioner is increased or decreased.

5. In a humidifying and heating system for a plurality of rooms, the combination of an air humidifier, air supply and return flues connecting the humidifier with the several rooms, means for admitting fresh air to the humidifier, humidity regulating means for controlling the temperature in the humidifier to maintain a predetermined humidity of the air supplied to the rooms by the humidifier, means controlled by said humidity regulating means for regulating the admission of fresh and return air to the humidifier and constructed to increase the admission of fresh air and decrease the admission of return air and conversely for decreasing or increasing the temperature in the humidifier, and means also controlled by said humidity regulating means for permitting or preventing escape of the return air in proportion as the admission of fresh air is increased or decreased.

6. In a humidifying and heating system for a plurality of rooms, the combination of an air humidifier, air supply and return flues connecting the humidifier with the several rooms, fresh air and return air dampers controlling respectively the admission of fresh air and return air from the rooms to the humidifier, a relief damper for permitting escape of the return air, humidity regulating means for controlling the humidity of the air supplied to the rooms by the humidifier, actuating means for said fresh and return air dampers controlled by said regulating means and constructed to cause one of said dampers to open as the other closes, means also controlled by said regulating means for opening and closing said relief damper correspondingly as the fresh air damper is opened and closed, and means for separately regulating the volume of the air supplied to each of the rooms.

7. In a humidifying and heating system for a plurality of rooms, the combination of an air humidifier, air supply and return flues connecting the humidifier with the several rooms, fresh air and return air dampers controlling respectively the admission of fresh air and return air from the rooms to the humidifier, a relief damper for permitting escape of the return air, humidity regulating means for controlling the humidity of the air supplied to the rooms by the humidifier, actuating means for said fresh and return air dampers controlled by said regulating means and constructed to cause one of said dampers to open as the other closes, means also controlled by said regulating means for opening and closing said relief damper correspondingly as the fresh air damper is opened and closed, and means for separately regulating the volume and the temperature of the air supplied to each of the rooms.

8. In a humidifying and heating system for a plurality of rooms, the combination of an air humidifier, air supply and return flues connecting the humidifier with the several rooms, fresh air and return air dampers controlling respectively the admission of fresh air and return air from the rooms to the humidifier, a relief damper for permitting escape of the return air, humidity regulating means for causing a predetermined definite humidity of the air supplied by the humidifier for delivery to the rooms, actuating means for said fresh and return air dampers controlled by said regulating means and constructed to cause one of said dampers to open as the other closes, means also controlled by said regulating means for opening and closing said relief dampers correspondingly as the fresh air damper is opened and closed, and means controlled by the humidities in the several rooms for separately regulating the volume of the air supplied to each of the rooms.

9. In a humidifying and heating system for a plurality of rooms, the combination of an air humidifier, air supply and return flues connecting the humidifier with the several rooms, fresh air and return air dampers controlling respectively the admission of fresh air and return air from the rooms to the humidifier, a relief damper for permitting escape of the return air, humidity regulating means for causing a predetermined definite humidity of the air supplied by the humidifier for delivery to the rooms, actuating means for said fresh and return air dampers controlled by said regulating means and constructed to cause one of said dampers to open as the other closes, means also controlled by said regulating means for opening and closing said relief dampers correspondingly as the return air damper is closed or opened, and means controlled by the humidities and temperatures in the several rooms for separately regulating the volume and the temperature of the air supplied to each of the rooms.

10. In an air conditioning system for a plurality of rooms, the combination of an air conditioner, air supply and return flues connecting the conditioner with the several rooms, means for admitting fresh air to the conditioner, humidity regulating means for controlling the humidity of the air supplied by the conditioner for delivery to the rooms, means controlled by said humidity regulating means for regulating the admission of fresh and return air to the conditioner and constructed to increases or decrease the admission of fresh air in proportion as the admission of return air is decreased or increased, air relief means, and automatic mechanism which positively actuates said air relief means to permit or prevent escape of the return air accordingly as the admission of return air to the conditioner is decreased or increased, and means for separately regulating the volume of the air supplied from the air conditioner to each of the rooms.

11. In an air conditioning system for a plurality of rooms, the combination of an air conditioner, air supply and return flues connecting the conditioner with the several rooms, means for admitting fresh air to the conditioner, humidity regulating means for causing a predetermined definite humidity of the air supplied by the conditioner for delivery to the rooms, means controlled by said humidity regulating means for regulating the admission of fresh and return air to the conditioner and constructed to increase or decrease the admission of fresh air in proportion as the admission of return air is decreased or increased, air relief means, and automatic mechanism which positively actuates said air relief means to permit or prevent escape of the return air accordingly as the admission of return air to the conditioner is decreased or increased, and means for separately regulating the volume and the temperature of the air supplied to each of the rooms.

12. In an air conditioning system for a plurality of rooms, the combination of an air conditioner, air supply and return flues connecting the conditioner with the several rooms, means for admitting fresh air to the conditioner, humidity regulating means for controlling the humidity of the air supplied by the conditioner for delivery to the rooms, means controlled by said humidity regulating means for regulating the admission of fresh and return air to the conditioner and constructed to increase or decrease the admission of fresh air in proportion as the admission of return air is decreased or increased, relief means constructed to permit or prevent escape of the return air accordingly as the admission of return air to the conditioner is decreased or increased, and means controlled by the humidities in the several rooms for separately regulating the volume of the air supplied from the air conditioner to each of the rooms.

13. In an air conditioning system for a plurality of rooms, the combination of an air conditioner, air supply and return flues connecting the conditioner with the several rooms, means for admitting fresh air to the conditioner, humidity regulating means for controlling the humidity of the air supplied by the conditioner for delivery to the rooms, means controlled by said humidity regulating means for regulating the admission of fresh and return air to the conditioner and constructed to increase or decrease the admission of fresh air in proportion as the admission of return air is decreased or increased, relief means constructed to permit or prevent escape of the return air accordingly as the admission of return air to the conditioner is decreased or increased, and means controlled by the humidities and temperatures in the several rooms for separately regulating the volume and the temperature of the air supplied from the air conditioner to each of the rooms.

Witness my hand this 17th day of February, 1920.

LEO L. LEWIS.

Witnesses:
H. L. JANET,
M. M. INGELS.